(12) United States Patent
Matsumura et al.

(10) Patent No.: US 10,994,583 B2
(45) Date of Patent: May 4, 2021

(54) STABILIZER BUSHING FOR ADHESIVE USE AND STABILIZER BAR EQUIPPED WITH STABILIZER BUSHING

(71) Applicants: SUMITOMO RIKO COMPANY LIMITED, Komaki (JP); TOYOTA JIDOSHA KABUSHIKI KAISHA, Toyota (JP)

(72) Inventors: Hiroyuki Matsumura, Komaki (JP); Masaki Shirashige, Toyota (JP); Motoyuki Shibata, Nisshin (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/281,613

(22) Filed: Feb. 21, 2019

(65) Prior Publication Data

US 2019/0263214 A1 Aug. 29, 2019

(30) Foreign Application Priority Data

Feb. 26, 2018 (JP) .............................. JP2018-031659

(51) Int. Cl.
*B60G 21/055* (2006.01)
*F16F 1/373* (2006.01)

(52) U.S. Cl.
CPC ........ *B60G 21/0551* (2013.01); *F16F 1/3732* (2013.01); *B60G 2204/1222* (2013.01);
(Continued)

(58) Field of Classification Search
CPC .... F16F 1/3863; F16F 1/3835; B60G 21/0551
See application file for complete search history.

(56) References Cited

U.S. PATENT DOCUMENTS 4,707,149 A * 11/1987 Hahle ................ B60G 21/0551
384/294
5,290,018 A * 3/1994 Watanabe .......... B60G 21/0551
267/141.3
(Continued)

FOREIGN PATENT DOCUMENTS

CN           107428219 A     12/2017
DE    10 2015 104 864 A1     10/2016
(Continued)

OTHER PUBLICATIONS

Feb. 11, 2020 Invitation pursuant to Rule 137(4) EPC and Article 94(3) EPC issued in European Patent Application No. 19159042.1.
(Continued)

*Primary Examiner* — Nicole T Verley
(74) *Attorney, Agent, or Firm* — Oliff PLC

(57) ABSTRACT

A stabilizer bushing for adhesive use including: a tubular rubber elastic body whose inner circumferential surface being configured to be adhered to a stabilizer bar; a bracket mounted onto an outer circumferential surface of the rubber elastic body and configured to be attached to a vehicle body; and concave/convex mated parts provided on axially opposite portions between the rubber elastic body and the bracket, the concave/convex mated parts protruding radially outward, wherein a mated height dimension of the concave/convex mated part is varied in a circumferential direction, and is made small at a position of input of a main radial load in the rubber elastic body.

6 Claims, 9 Drawing Sheets

(52) U.S. Cl.
CPC .. *B60G 2204/1224* (2013.01); *B60G 2204/41* (2013.01); *B60G 2204/41043* (2013.01); *B60G 2206/73* (2013.01); *B60G 2206/821* (2013.01)

(56) References Cited

U.S. PATENT DOCUMENTS

| | | | | |
|---|---|---|---|---|
| 6,889,988 B2* | 5/2005 | Cai | .................... | B60G 21/0551 |
| | | | | 267/293 |
| 8,505,940 B1* | 8/2013 | Hufnagle | ........... | B60G 21/0551 |
| | | | | 280/124.13 |
| 9,393,852 B2* | 7/2016 | Kobayashi | ......... | B60G 21/0551 |
| 9,981,524 B2* | 5/2018 | Matsumura | ........ | B60G 21/0551 |
| 10,449,823 B2* | 10/2019 | Saihara | ............... | B29C 65/4835 |
| 10,661,627 B2* | 5/2020 | Uchida | .............. | B60G 21/0551 |
| 10,753,417 B2* | 8/2020 | Akiyama | ........... | B60G 21/0551 |
| 10,759,250 B2* | 9/2020 | Umeno | ............. | B60G 21/0551 |
| 2012/0299261 A1* | 11/2012 | Nagai | ....................... | F16F 1/16 |
| | | | | 280/124.107 |
| 2017/0080772 A1 | 3/2017 | Matsumura et al. | | |
| 2018/0056747 A1 | 3/2018 | Lechner et al. | | |

FOREIGN PATENT DOCUMENTS

| | | | |
|---|---|---|---|
| DE | 10 2016 010 313 A1 | 3/2017 | |
| EP | 2987666 A1 | 2/2016 | |
| EP | 2 855 178 B1 | 4/2016 | |
| JP | H04-114807 U | 10/1992 | |
| JP | H05-77632 A | 3/1993 | |
| JP | 2005-212780 A | 8/2005 | |
| JP | 2008018932 A * | 1/2008 | ......... B60G 21/0551 |
| JP | 2008213751 A * | 9/2008 | |
| JP | 2017-149371 A | 8/2017 | |
| KR | 10-2010-0018872 A | 2/2010 | |
| KR | 10-1470799 B1 | 12/2014 | |
| KR | 101570320 B1 | 11/2015 | |
| WO | WO-2013178896 A1 * | 12/2013 | ......... B60G 21/0551 |

OTHER PUBLICATIONS

Apr. 2, 2020 Office Action issued in European Patent Application No. 19159042.1.
Jun. 23, 2020 Office Action issued in Chinese Patent Application No. 201910133078.3.
Jul. 23, 2019 Extended Search Report issued in European Patent Application No. 19159042.1.
Oct. 27, 2020 Office Action issued in European Patent Application No. 19159042.1.
Sep. 10, 2020 Office Action issued in European Patent Application No. 19159042.1.
Mar. 4, 2021 Office Action issued in European Patent Application No. 19159042.1.

* cited by examiner

STABILIZER BUSHING FOR ADHESIVE USE AND STABILIZER BAR EQUIPPED WITH STABILIZER BUSHING

INCORPORATED BY REFERENCE

The disclosure of Japanese Patent Application No. 2018-031659 filed on Feb. 26, 2018 including the specification, drawings and abstract is incorporated herein by reference in its entirety.

BACKGROUND OF THE INVENTION

1. Field of the Invention

The present invention relates to a stabilizer bushing for adhesive use connecting a stabilizer bar to a vehicle body in a vibration-damping manner, and a stabilizer bar equipped with a stabilizer bushing in a state where the stabilizer bushing for adhesive use is attached to the stabilizer bar.

2. Description of the Related Art

Conventionally, there has been known a stabilizer bushing for adhesive use which links the stabilizer bar to a vehicle body in a vibration-damping manner. As shown in, for example, Japanese Unexamined Patent Publication No. JP-A-2017-149371, a stabilizer bushing for adhesive use has a structure wherein a tubular rubber elastic body is mounted on the stabilizer bar in an externally fitted state, with the inner circumferential surface adhered to the stabilizer bar, and a bracket attached to a vehicle body such as a sub frame is attached to an outer peripheral surface of the rubber elastic body.

Since the rubber elastic body is adhered to the stabilizer bar in the stabilizer bushing for adhesive use, movement of the rubber elastic body relative to the bracket tends to become a problem. Specifically, when the rubber elastic body is displaced in the axial direction relative to the bracket due to displacement or deformation, the rubber elastic body may be separated from the bracket in the axial direction.

Therefore, in the adhesive-type stabilizer bushing disclosed in JP-A-2017-149371, mountain portions protruding toward the outer periphery are provided on both axial side portions of the rubber elastic body, and the mountain portions are inserted into groove-like portions provided in the bracket. When the rubber elastic body and the bracket undergo relative displacement in the axial direction, the mountain portions of the rubber elastic body are pressed in the axial direction against axial wall portions of the groove-like portions of the bracket, thereby exhibiting a resistance force to be axially dislodged from the bracket for the rubber elastic body.

However, in the structure of JP-A-2017-149371, the axially inner surface of the mountain portion of the rubber elastic body and an axially inner side wall portion of the groove-like portion of the bracket are both inclined relative to the radial direction. Therefore, it is conceivable that, when a radial input presses the axially inner side wall portion of the groove-like portion of the bracket against the mountain portion of the rubber elastic body, an axial outward force acts on the mountain portion, and noise is generated due to rubbing of the mountain portion against the bracket or the like. Particularly, when the mountain portion of the rubber elastic body is repeatedly deformed so as to be pushed axially outward from the groove-like portion of the bracket, a gap between the mountain portion and the groove-like portion of the bracket may be generated due to sinkage of the mountain portion of the rubber elastic body. Then, noise may occur due to entry of water or the like into the gap.

SUMMARY OF THE INVENTION

It is therefore one object of the present invention to provide a stabilizer bushing for adhesive use of novel structure capable of preventing a rubber elastic body adhered to a stabilizer bar from being displaced relative to a bracket in the axial direction, and thus preventing noise, dislodgement, and the like.

It is another object of the present invention to provide a stabilizer bar equipped with a stabilizer bushing in which the stabilizer bushing for adhesive use is attached to the stabilizer bar in an adhered state.

The above and/or optional objects of this invention may be attained according to at least one of the following preferred embodiments of the invention. The following preferred embodiments and/or elements employed in each preferred embodiment of the invention may be adopted at any possible optional combinations.

Specifically, a first preferred embodiment of the present invention provides a stabilizer bushing for adhesive use comprising: a tubular rubber elastic body whose inner circumferential surface being configured to be adhered to a stabilizer bar; a bracket mounted onto an outer circumferential surface of the rubber elastic body and configured to be attached to a vehicle body; and concave/convex mated parts provided on axially opposite portions between the rubber elastic body and the bracket, the concave/convex mated parts protruding radially outward, wherein a mated height dimension of the concave/convex mated part is varied in a circumferential direction, and is made small at a position of input of a main radial load in the rubber elastic body.

According to the stabilizer bushing for adhesive use of this structure according to the first preferred embodiment, the rubber elastic body and the bracket are locked in the axial direction at the concave/convex mated parts. As a result, the rubber elastic body and the bracket are axially positioned, thus making it possible to prevent the rubber elastic body adhered to the stabilizer bar from being dislodged from the bracket in the axial direction.

Further, the mated height dimension of the concave/convex mated part is made small at the position of input of the main radial load in the rubber elastic body. Consequently, with respect to the input of the main radial load, the axial outward force acting on the portion constituting the concave/convex mated part in the rubber elastic body becomes small. This makes it possible to prevent both axial side portions of the rubber elastic body from being displaced outward in the axial direction relative to the bracket. Therefore, it is possible to prevent noise which might be caused by rubbing between the rubber elastic body and the bracket or relative displacement between the bracket and the both axial side portions of the rubber elastic body in a state where water is contained between the rubber elastic body and the bracket.

A second preferred embodiment of the present invention provides the stabilizer bushing according to the first preferred embodiment, wherein the mated height dimension of the concave/convex mated part gradually decreases from circumferentially opposite sides toward the position of input of the main radial load in the rubber elastic body.

According to the second preferred embodiment, the mated height dimension of the concave/convex mated part gradually changes in the circumferential direction, whereby the stress is dispersed. Thus, for example, sinkage of the rubber elastic body at the concave/convex mated part is less likely to occur, so that water or the like is less likely to enter between the rubber elastic body and the bracket at the concave/convex mated part.

A third preferred embodiment of the present invention provides the stabilizer bushing according to the first or second preferred embodiment, wherein the rubber elastic body is constituted by a first half body and a second half body each having a half tube shape, the first half body and the second half body being combined face-to-face with each other, a direction of input of the main radial load with respect to the rubber elastic body is a direction of combination of the first half body and the second half body, and the mated height dimension of the concave/convex mated part provided between the bracket and a circumferentially center portion of the first half body is smaller than the mated height dimension of the concave/convex mated part provided between the bracket and a pair of side faces of the second half body.

According to the third preferred embodiment, the rubber elastic body can be easily attached to the stabilizer bar by clamping the stabilizer bar between the first half body and the second half body. In addition, the direction of input of the main radial load is the direction of combination of the first half body and the second half body. As a result, the main radial load hardly acts as a shear force on the circumferential ends of the first half body and the second half body that are butted on each other. Consequently, the main radial load can be stably received by the first half body and the second half body.

Furthermore, the mated height dimension of the concave/convex mated part is made small at the circumferentially center portion of the first half body. In the first half body where the radial compression amount due to the input of the main radial load is likely to be large, it is possible to reduce the axially outward force acting on both axial side portions constituting the concave/convex mated part. On the other hand, the mated height dimension of the concave/convex mated part is made larger in the second half body. By so doing, in sides of the second half body where the radial compression amount due to the input of the main radial load is smaller than the circumferentially center portion of the first half body, it is possible to effectively obtain a resistance force to be axially dislodged from the bracket for the rubber elastic body, using the concave/convex mated parts.

A fourth preferred embodiment of the present invention provides the stabilizer bushing according to any one of the first to third preferred embodiments, further comprising a rigid intermediate member disposed in a radially middle portion of the rubber elastic body and extending in the circumferential direction of the rubber elastic body.

According to the fourth preferred embodiment, it is possible to efficiently realize hard spring characteristics in the radial direction and soft spring characteristics in the torsional direction. In addition, the substantial rubber volume of the rubber elastic body compressed in the radial direction by pressing of the bracket becomes smaller than that in the absence of the intermediate member, thus decreasing the deformation amount of the rubber elastic body toward the axial outside.

A fifth preferred embodiment of the present invention provides the stabilizer bushing according to any one of the first to fourth preferred embodiments, wherein axially opposite end portions of the bracket superposed on the outer circumferential surface of the rubber elastic body include a tapered part inclining radially inward toward an axial outside.

According to the fifth preferred embodiment, deformation of the rubber elastic body to the outside in the axial direction can be limited by the tapered part. Also, the radial precompression amount of the both axial end portions of the rubber elastic body is increased by the tapered part. Thus, it is possible to set spring characteristics of target hardness at both axial end portions of the rubber elastic body whose spring characteristics tend to be softened by bulging of the axial end face.

Also, a sixth preferred embodiment of the present invention provides a stabilizer bar equipped with the stabilizer bushing according to any one of the first to fifth preferred embodiments, wherein the inner circumferential surface of the rubber elastic body is pressed against an outer circumferential surface of the stabilizer bar, and the inner circumferential surface of the rubber elastic body is adhered to the outer circumferential surface of the stabilizer bar.

According to the stabilizer bar equipped with the stabilizer bushing having this structure according to the sixth preferred embodiment, the rubber elastic body adhered to the stabilizer bar hardly slips out of the bracket in the axial direction, and the stabilizer bar can be stably kept in the target state of being attached to the vehicle. In addition, when the rubber elastic body is compressed in the radial direction between the bracket and the stabilizer bar, both axial side portions of the rubber elastic body are prevented from being displaced in the axial direction relative to the bracket, whereby noise can be prevented.

According to the present invention, in the concave/convex mated parts provided between both axial side portions of the rubber elastic body and both axial side portions of the bracket, the rubber elastic body and the bracket are engaged in the axial direction. This positions the rubber elastic body and the bracket in the axial direction, thus making it possible to prevent the rubber elastic body adhered to the stabilizer bar from slipping off from the bracket in the axial direction. Moreover, the mated height dimension of the concave/convex mated part is made small at the position of input of the main radial load. Consequently, with respect to the input of the main radial load, the force to the axial outside acting on the rubber elastic body of the concave/convex mated part becomes small. This makes it possible to avoid noise which might occur due to displacement of both axial side portions of the rubber elastic body to the outside in the axial direction relative to the bracket.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

Hereinafter, a practical embodiment of the present invention will be described with reference to the drawings.

FIGS. 1 to 4 show a stabilizer bar equipped with a stabilizer bushing 10 according to a first practical embodiment of the present invention in a mounted state to a vehicle. The stabilizer bar equipped with the stabilizer bushing 10 has a structure wherein a stabilizer bushing for adhesive use 12 according to the present invention is attached to a stabilizer bar 14 such that it is externally disposed about the stabilizer bar 14. In the following description, in a general rule, the up-down direction means the up-down direction in FIG. 1, the front-back direction means the left-right direction in FIG. 2, which is the axial direction, and the left-right direction means the left-right direction in FIG. 1. In the present practical embodiment, the position of input of the main radial load in the stabilizer bushing for adhesive use 12 is the left-right center portion of the upper surface of a rubber elastic body 16, which will be described later. The direction of input of the main radial load is the up-down direction in which compression deformation in the up-down direction occurs at the left-right central portion of the upper surface of the rubber elastic body 16.

Figure 1:
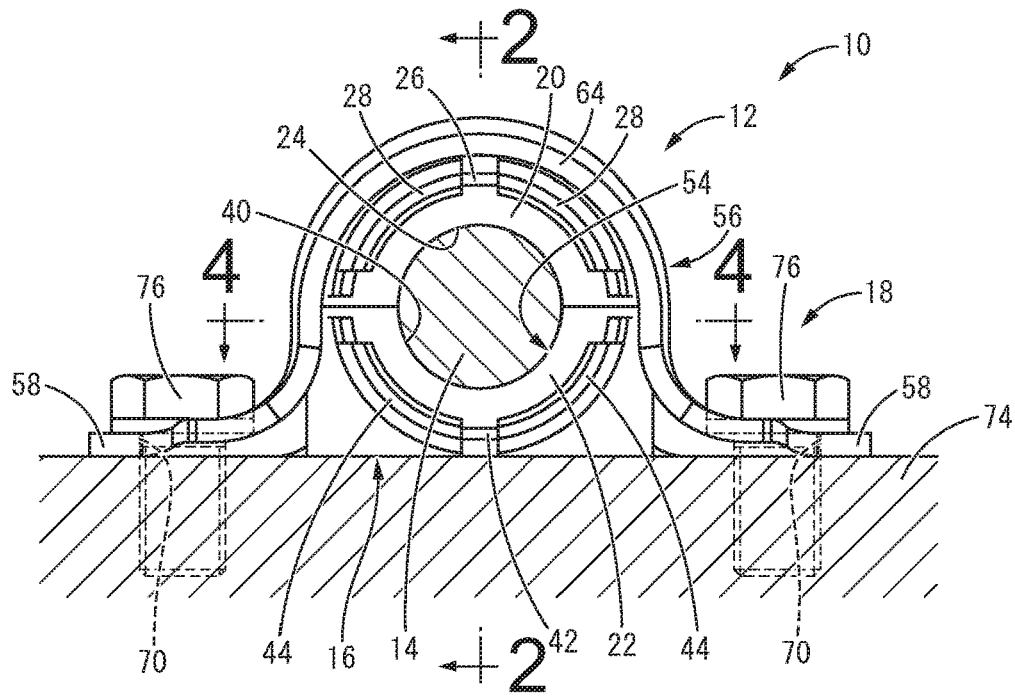
FIG. 1 is a front view showing a stabilizer bar equipped with a stabilizer bushing according to a first practical embodiment of the present invention in a mounted state to a vehicle.
Figure 2:
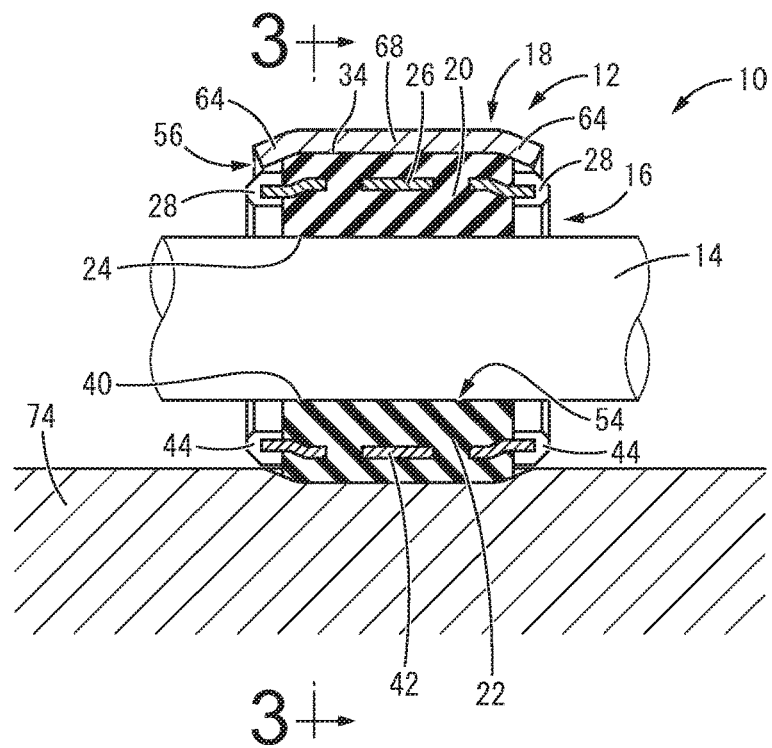
FIG. 2 is a cross section view taken along line 2-2 of FIG. 1.

More specifically, the stabilizer bushing for adhesive use 12 has a structure wherein a bracket 18 is mounted onto the outer circumferential surface of the tubular rubber elastic body 16. The rubber elastic body 16 is constituted by a first half body 20 and a second half body 22, as shown in FIGS. 1 and 2.

As shown in FIGS. 5 to 8, the first half body 20 has a substantially semi-cylindrical shape. A first recessed groove 24 is formed penetrating in the front-back direction with a substantially semi-circular cross-section while opening to the lower surface of the first half body 20. As a result, the first half body 20 has an approximately semi-cylindrical shape that is convex to the upper side as a whole. Further, a first intermediate member 26 is fixed to the radially middle portion of the first half body 20. The first intermediate member 26 is a rigid member formed of a metal or the like and has a substantially semi-cylindrical shape that is convex to the upper side. Each end portion in the axial direction of the first intermediate member 26 has a smaller diameter than that of the axially intermediate portion of the first intermediate member 26. Besides, both axial end portions of the first intermediate member 26 protrude axially outward from the axial end face of the first half body 20 to be covered by a first covering rubber 28, which is formed integrally with the first half body 20. Both ends and the central portion in the circumferential direction of the first intermediate member 26 are exposed from the first covering rubber 28.

The first half body 20 has a first mountain portion 30 which protrudes radially outward at each end portion in the axial direction. The height dimension of the first mountain portion 30 gradually decreases from circumferentially opposite ends toward the center in the circumferential direction. At the circumferentially center portion of the first half body 20, the height dimension of the first mountain portion 30 is approximately zero. In the present practical embodiment, the outer circumferential surface of each axial end portion of the first half body 20 provided with the first mountain portion 30 is positioned on substantially the same arc across the circumferential entire length, at least in the axial center portion of the first mountain portion 30. The depth dimension of a first groove-shaped portion 32 formed axially between the first mountain portions 30, 30 gradually decreases from circumferentially opposite ends toward the center in the circumferential direction of the first half body 20. Consequently, the height dimension of the first mountain portion 30 gradually decreases toward the center in the circumferential direction. The outer circumferential surface of the circumferentially center portion of the first half body 20 where the height dimension of the first mountain portion 30 is substantially zero includes a flat pressure-receiving portion 34 extending linearly in the axial direction over the entire axial length.

An end portion on the axially inner side of the first mountain portion 30 has a chamfered first inner inclined surface 36. Thus, the width dimension of the first inner inclined surface 36 gradually increases toward the end in the circumferential direction of the first half body 20. Further, a chamfered first outer inclined surface 38 is provided at each end portion in the circumferential direction of the first half body 20, at the axially outer end edge portion of the first mountain portion 30.

On the other hand, as shown in FIGS. 9 to 12, the second half body 22 has a substantially rectangular block shape. Additionally, a second recessed groove 40 is formed penetrating in the front-back direction with a substantially semi-circular cross section while opening to the upper surface of the second half body 22. As a result, the second half body 22 has an irregular semi-tubular shape that is concave to the upper side as a whole. Further, a second intermediate member 42 is fixed to the radially middle portion of the second half body 22. The second intermediate member 42 is a rigid member formed of a metal or the like and has a substantially semi-cylindrical shape that is concave to the upper side. Each axial end portion of the second intermediate member 42 has a smaller diameter than that of the axially intermediate portion of the second intermediate member 42. Besides, both axial end portions of the second intermediate member 42 protrude axially outward from the axial end faces of the second half body 22 to be covered by a second covering rubber 44, which is formed integrally with the second half body 22. Both ends and the central portion in the circumferential direction of the second intermediate member 42 are exposed from the second covering rubber 44.

Figure 11:
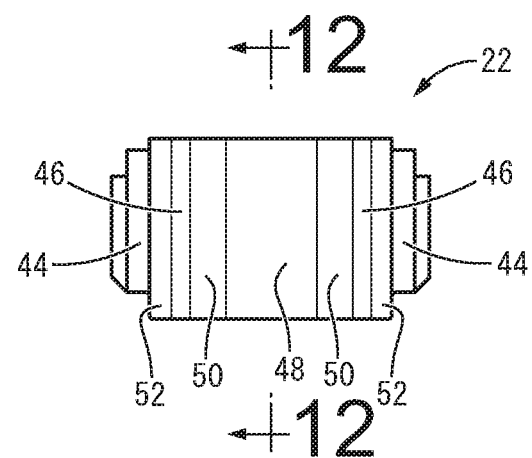
FIG. 11 is a right side view of the second half body shown in FIG. 9.
Figure 12:
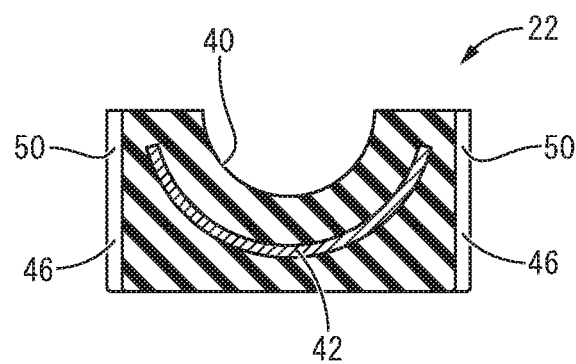
FIG. 12 is a cross section view taken along line 12-12 of FIG. 11.
Figure 13:
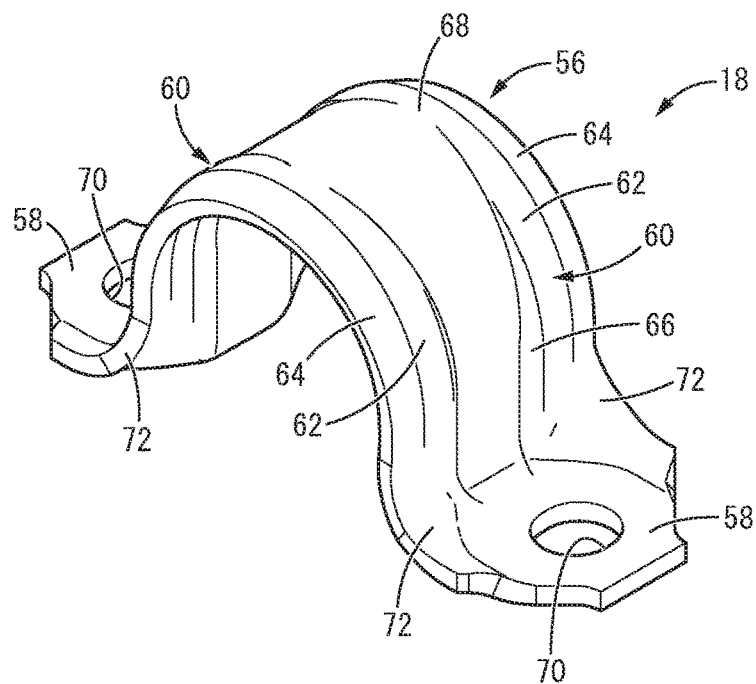
FIG. 13 is a perspective view of a bracket constituting the stabilizer bar equipped with the stabilizer bushing shown in FIG. 1.
Figure 14:
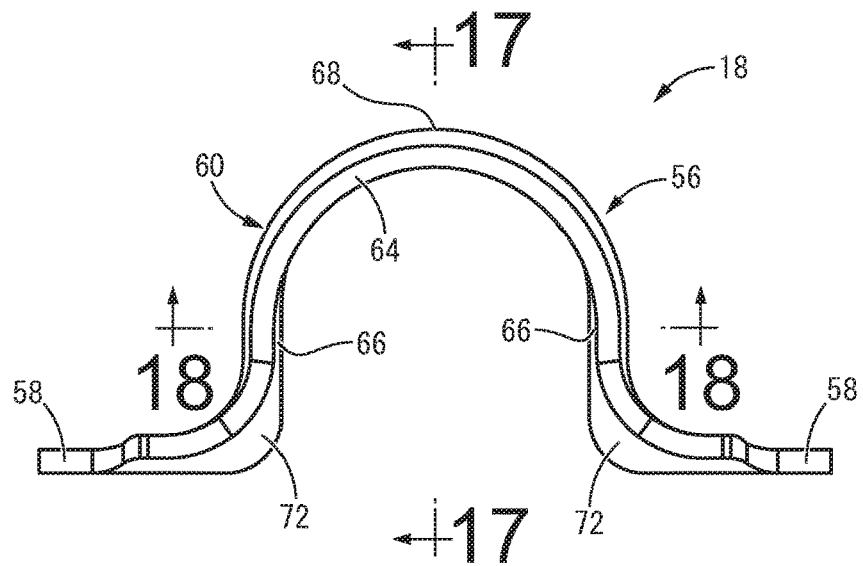
FIG. 14 is a front view of the bracket shown in FIG. 13.
Figure 15:
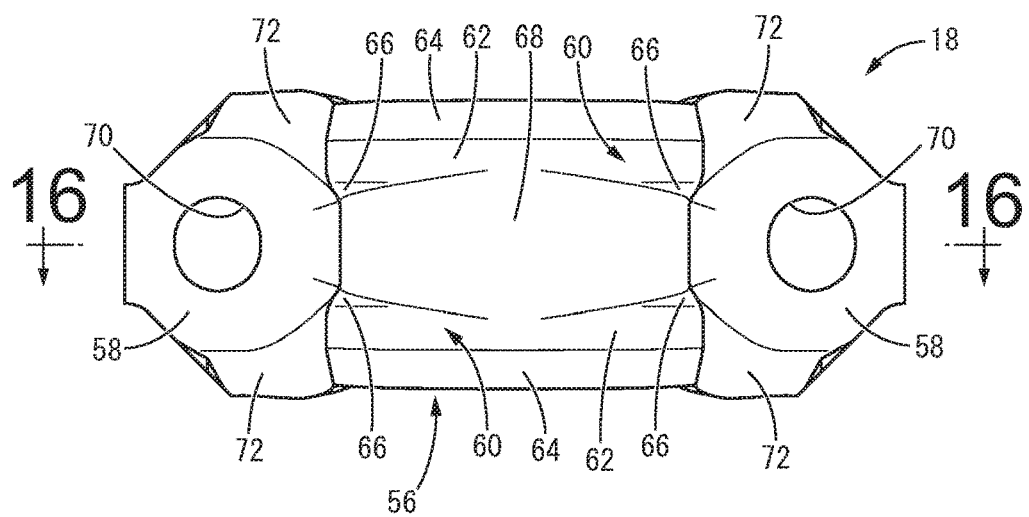
FIG. 15 is a plan view of the bracket shown in FIG. 13.
Figure 16:
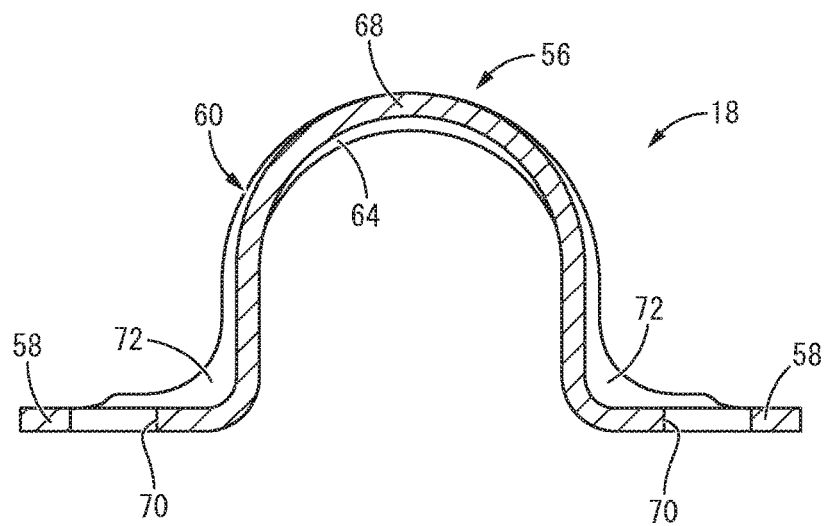
FIG. 16 is a cross section view taken along line 16-16 of FIG. 15.

The second half body 22 has a second mountain portion 46 which protrudes radially outward at each end portion in the axial direction. The second mountain portion 46 is formed projecting in the left and right side surfaces of the second half body 22, and is provided continuously with a nearly constant height dimension across the entire up-down length, as FIGS. 11 and 12 show. The height dimension of the second mountain portion 46 is nearly equal to the height dimension of the first mountain portion 30 in the circumferentially opposite ends of the first half body 20. Additionally, the transverse cross section surface shape of the second mountain portion 46 is nearly equal to the transverse cross section surface shape of the first mountain portion 30 in the circumferentially opposite ends of the first half body 20. A second groove-shaped portion 48 is formed axially between the second mountain portions 46, 46 provided at both end portions in the axial direction, so as to open toward the left-right outside while extending in the up-down direction. The depth dimension of the second groove-shaped portion 48 is substantially constant over the entire up-down length.

A second inner inclined surface 50 inclined outward in the axial direction as it goes toward the outside in the left-right direction is formed at the axially inner end edge portion of the second mountain portion 46. Moreover, a second outer inclined surface 52 inclined inward in the left-right direction as it goes toward the axially outer side is formed at the axially outer end edge portion of the second mountain portion 46. The second inner and outer inclined surfaces 50, 52 of the second mountain portion 46 are formed to have substantially constant width dimensions over the entire up-down length.

Figure 3:
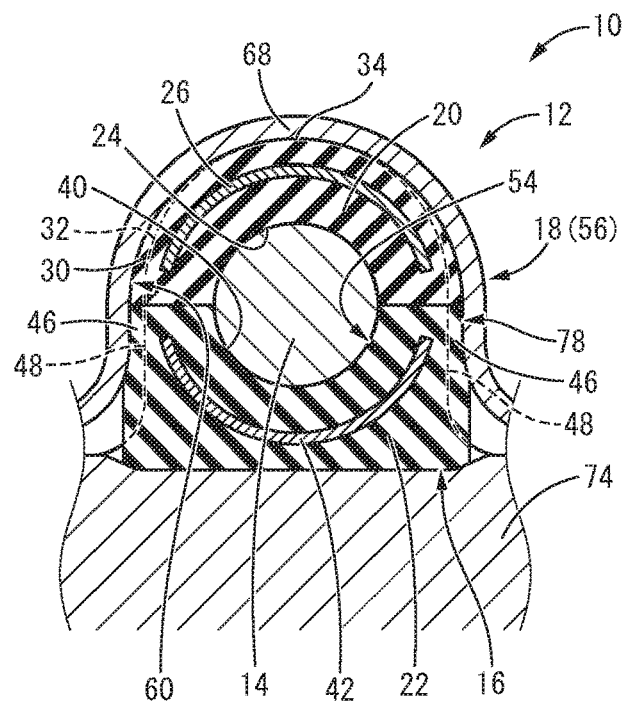
FIG. 3 is a cross section view taken along line 3-3 of FIG. 2.
Figure 4:
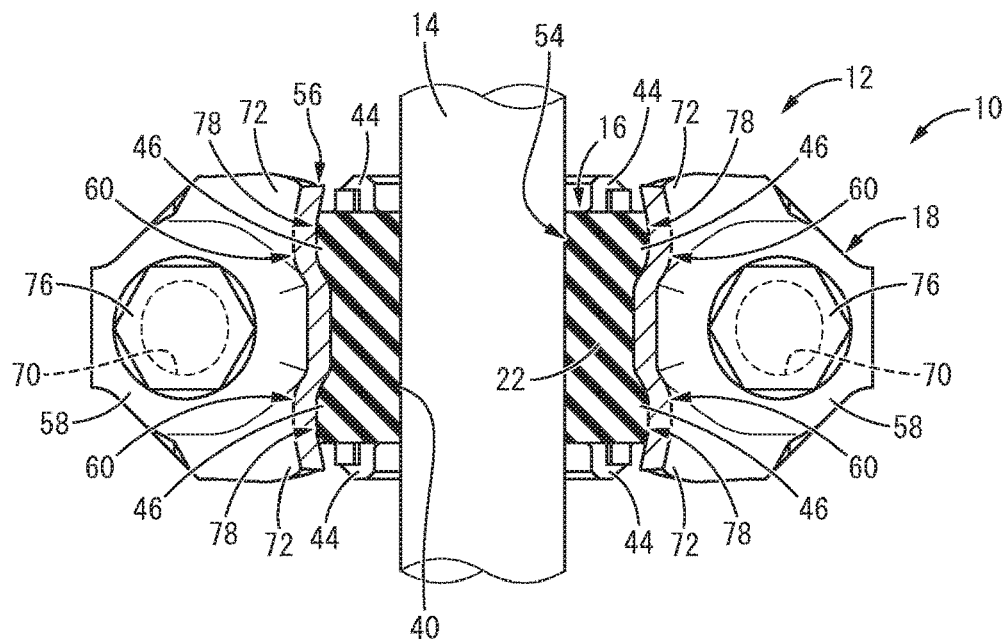
FIG. 4 is a cross section view taken along line 4-4 of FIG. 1.
Figure 5:
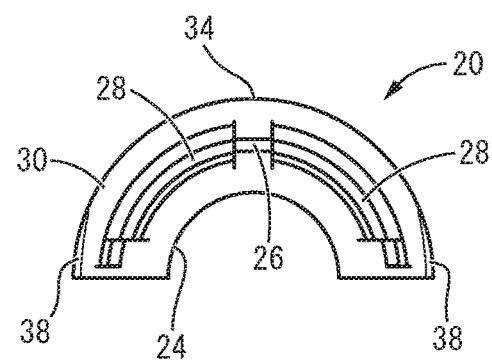
FIG. 5 is a front view of a first half body of the stabilizer bar equipped with the stabilizer bushing shown in FIG. 1.
Figure 6:
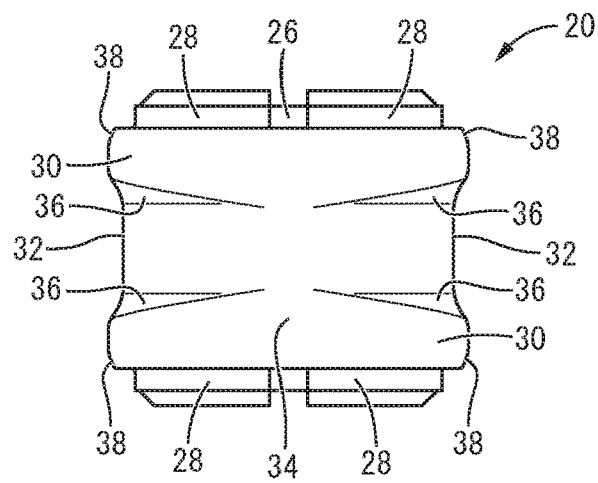
FIG. 6 is a plan view of the first half body shown in FIG. 5.
Figure 7:
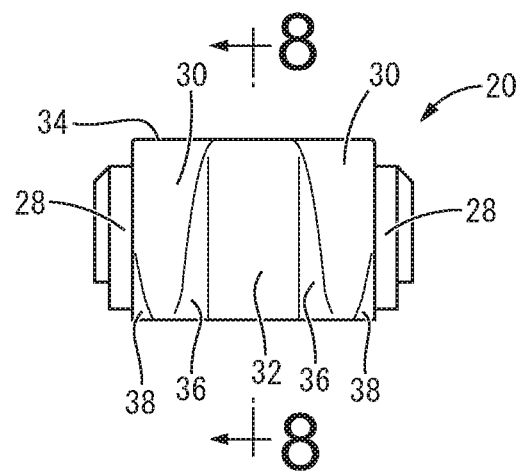
FIG. 7 is a right side view of the first half body shown in FIG. 5.
Figure 8:
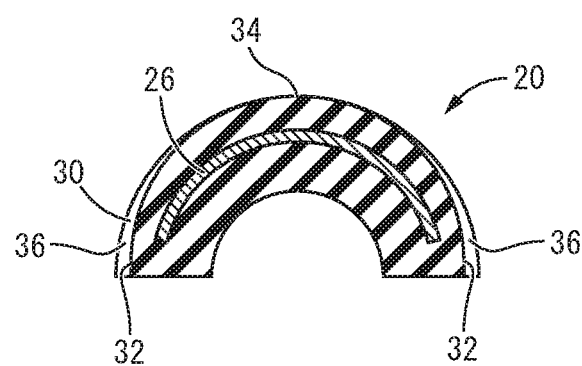
FIG. 8 is a cross section view taken along line 8-8 of FIG. 7.
Figure 9:
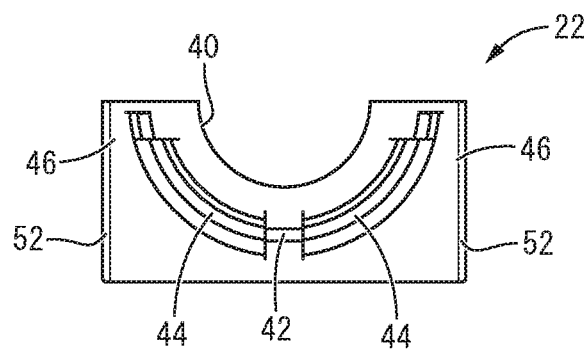
FIG. 9 is a front view of a second half body of the stabilizer bar equipped with the stabilizer bushing shown in FIG. 1.
Figure 10:
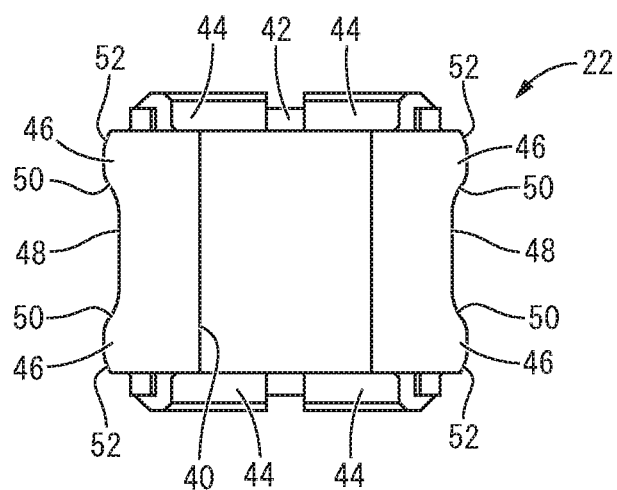
FIG. 10 is a plan view of the second half body shown in FIG. 9.

Then, as shown in FIGS. 1 to 3, the first half body 20 and the second half body 22 are combined face-to-face with each other in the up-down direction, thereby constituting the tubular rubber elastic body 16. The first half body 20 and the second half body 22 are arranged to face each other. In other words, the circumferential ends of the first half body 20 and the circumferential ends of the second half body 22 are arranged in a direction in which they are butted against each other. By so doing, in the rubber elastic body 16, an insertion hole 54 having a substantially circular cross section penetrating in the front-back direction is formed by the first recessed groove 24 of the first half body 20 and the second recessed groove 40 of the second half body 22.

The first half body 20 and the second half body 22 are combined so that they clamp the stabilizer bar 14 in the up-down direction. The stabilizer bar 14 is disposed to penetrate the rubber elastic body 16 in a state where it is inserted through the insertion hole 54. The inner circumferential surface of the rubber elastic body 16 is pressed against the outer circumferential surface of the stabilizer bar 14. An adhesive is applied to at least one of the groove inner surface of the first recessed groove 24 of the first half body 20 and the groove inner surface of the second recessed groove 40 of the second half body 22, and the outer circumferential surface of the stabilizer bar 14, whereby the stabilizer bushing is attached to the stabilizer bar 14 in an adhered state.

In this manner, the rubber elastic body 16 is constituted by combining the first half body 20 and the second half body 22, whereby the rubber elastic body 16 can easily be externally disposed and attached on and about the stabilizer bar 14. In addition, the first half body 20 and the second half body 22 are combined in the up-down direction, which is the direction of input of the main radial load on the rubber elastic body 16. This makes it possible to avoid the main radial load from acting as a shear force on each circumferential end portion of the first half body 20 and the second half body 22. As a result, stable support of the stabilizer bar 14 and stable exhibition of target spring characteristics, improvement in durability and the like are realized.

Furthermore, in the outer peripheral surface of the rubber elastic body 16 formed by combining the first half body 20 and the second half body 22, the first mountain portion 30 of the first half body 20 and the left and right second mountain portions 46, 46 of the second half body 22 are arranged in series in the circumferential direction. The first mountain portion 30 and the left and right second mountain portions 46, 46 are continuous in the up-down direction.

The bracket 18 is attached to the rubber elastic body 16. The bracket 18 is a highly rigid member made of metal or the like, and as shown in FIGS. 13 to 18, the bracket 18 has a structure wherein attachment portions 58, 58 are integrally formed on circumferentially opposite sides of a mounting portion 56 which is formed in a substantially semi-cylindrical shape.

The mounting portion 56 has a generally semi-cylindrical shape as a whole, and groove-shaped concave parts 60 that are concave to the radial inside are formed to extend in the circumferential direction at axially opposite portions of the mounting portion 56. More specifically, the concave part 60 has a bottom wall portion 62 extending in the circumferential direction with a substantially arcuate cross section, an outside wall portion 64 which is positioned on the outside in the axial direction of the bottom wall portion 62 and spreading inclined inward in the radial direction as it goes to the axial outside. The concave part 60 also has an inside wall portion 66 which is located axially inward of the bottom wall portion 62 and extends so as to be inclined inward in the radial direction as it goes toward the axial inside.

Figure 17:
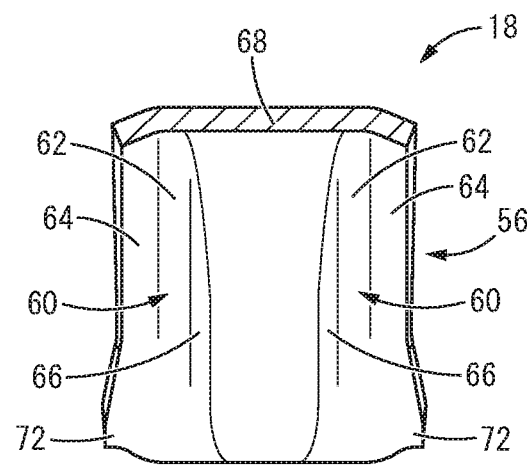
FIG. 17 is a cross section view taken along line 17-17 of FIG. 14.
Figure 18:
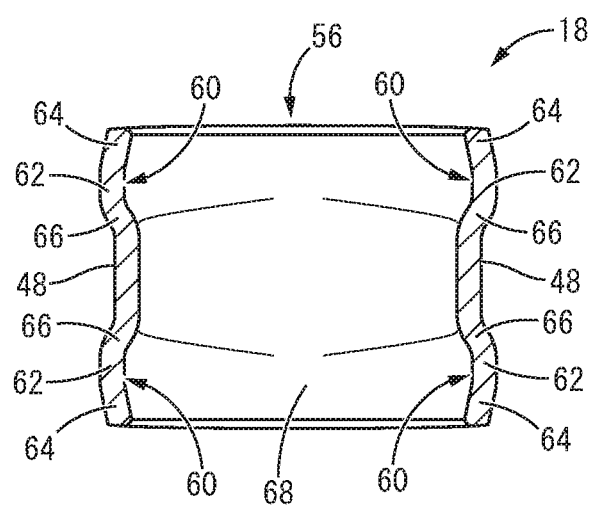
FIG. 18 is a cross section view taken along line 18-18 of FIG. 14.

Further, the depth dimension of the concave part 60 gradually decreases from circumferentially opposite ends of the mounting portion 56 toward the center in the circumferential direction. The depth dimension of the concave part 60 in the circumferentially center portion of the mounting portion 56 is substantially zero. By so doing, a flat abutting portion 68 is provided at the center portion in the circumferential direction of the mounting portion 56. As FIG. 17 shows, the flat abutting portion 68 is formed such that the axially intermediate portion extends linearly in the axial direction with substantially the same diameter as that of the bottom wall portion 62 of the concave part 60, while both axial end portions are constituted by the outside wall portion 64 and are inclined to the radial inside as it goes outward in the axial direction. A tapered part inclining radially inward toward the axial outside is constituted by the outside wall portion 64 of the concave part 60 including both axial end portions of the flat abutting portion 68, at the axially opposite end portions of the mounting portion 56.

The attachment portion 58 is formed in a plate shape, and a bolt hole 70 is formed penetrating the attachment portion 58 in the up-down direction, namely the thickness direction. The attachment portion 58 is provided so as to extend laterally outward from the circumferential end portion of the mounting portion 56. The bracket 18 of the present practical embodiment is formed by press working of a plate material. The left and right sides of the mounting portion 56 are bent to integrally form the left and right attachment portions 58, 58, whereby deformation rigidity of the bracket 18 is efficiently secured. Furthermore, the connecting portions between the mounting portion 56 and the left and right attachment portions 58, 58 integrally include reinforcing ribs 72 bent so that both axial end portions thereof tilt upward as it goes outward in the axial direction. The strength of the connecting portions between the mounting portion 56 and the attachment portions 58, 58 also improves.

As shown in FIGS. 1 to 4, the bracket 18 is attached to the rubber elastic body 16. That is, the mounting portion 56 of the bracket 18 is fitted to the rubber elastic body 16 from the upper side. The mounting portion 56 is superposed on the outer peripheral surface of the first half body 20 and the upper portion of the left and right side surfaces of the second half body 22 in contact with them.

Further, in the bracket 18 mounted onto the outer circumferential surface of the rubber elastic body 16, the left and right attachment portions 58, 58 are attached to a vehicle body 74 such as a sub frame. That is, bolts 76 inserted through the bolt holes 70 of the attachment portions 58, 58 are threaded onto the vehicle body 74, whereby the bracket 18 is fixed to the vehicle body 74 at the attachment portions 58, 58. Consequently, the stabilizer bar 14 is connected in a vibration-damping manner to the vehicle body 74 via the stabilizer bushing for adhesive use 12.

By fixing the bracket 18 to the vehicle body 74, the bracket 18 is fitted and attached to the outer circumferential surface of the rubber elastic body 16 in a non-adhesive way. Then, the bracket 18 is attached in a non-adhesive way to the rubber elastic body 16 adhered externally to and around the stabilizer bar 14. Thus, the stabilizer bar equipped with the stabilizer bushing 10 wherein the stabilizer bushing for adhesive use 12 is attached to the stabilizer bar 14 is constituted in an attached state to the vehicle body 74.

It is possible to improve the durability by preventing entry of debris between this stabilizer bushing for adhesive use 12 and the stabilizer bar 14, without increasing the contact force on the stabilizer bar 14 at both axial end portions of the stabilizer bushing. Therefore, as compared with a non-adhesive type stabilizer bushing that is mounted to the stabilizer bar 14 in a non-adhesive way, the degree of freedom in designing the spring characteristics improves, and lowering the spring in the prizing direction becomes easy.

The attachment portions 58, 58 of the bracket 18 are attached to the vehicle body 74, whereby the first half body 20 of the rubber elastic body 16 is pre-compressed in the radial directions between the bracket 18 and the stabilizer bar 14. Meanwhile, the second half body 22 of the rubber elastic body 16 is radially pre-compressed between the stabilizer bar 14 and the vehicle body 74. In the present practical embodiment, the first intermediate member 26 is fixed to the first half body 20, and the outer peripheral side and the radially inner side of the first half body 20 relative to the first intermediate member 26 are respectively radially pre-compressed. Likewise, the second intermediate member 42 is fixed to the second half body 22, and the outer peripheral side and the radial inside of the second intermediate member 42 in the second half body 22 are respectively radially pre-compressed. Although not explicitly shown in the drawings, the rubber elastic body 16 is pre-compressed in the radial directions as described above, whereby the axial end surfaces of the rubber elastic body 16 can be deformed so as to slightly bulge outward in the axial direction.

Here, the first mountain portion 30 and the left and right second mountain portions 46, 46 of the rubber elastic body 16 are fitted into the concave part 60 provided in the mounting portion 56 of the bracket 18. The first mountain portion 30 and the left and right second mountain portions 46, 46 are abutted and superposed in the axial direction on the inside and outside wall portions 66, 64 of the concave part 60. The first mountain portion 30 and the left and right second mountain portions 46, 46 are abutted on and engaged with the inside and outside wall portions 66, 64 of the concave part 60 in the bracket 18 in the axial direction. Consequently, the rubber elastic body 16 is positioned relative to the bracket 18 in the axial direction.

Further, by fitting the first and second mountain portions 30, 46, 46 of the rubber elastic body 16 into the concave part 60 of the bracket 18, concave/convex mated parts 78 are provided between the rubber elastic body 16 and the bracket 18, so as to be abutted on and engaged with each other in the axial direction. The concave/convex mated part 78 is provided at each axial end portion of the stabilizer bushing for adhesive use 12. The height dimension of the first mountain portion 30 is small at the circumferential center of the first half body 20, while the depth dimension of the concave part 60 is small at the circumferential center of the mounting portion 56. As is clear from these facts, the mated height dimension of the concave/convex mated part 78 is smaller at the circumferential center of the first half body 20 and the mounting portion 56, than at the both circumferential sides. In particular, in this practical embodiment, the mated height dimension of the concave/convex mated part 78 continuously decreases from both circumferential ends of the first half body 20 to the circumferential center. The height dimension of the first mountain portion 30 at the both circumferential ends of the first half body 20 and the height dimension of the second mountain portion 46 are substantially the same. The mated height dimension of the concave/convex mated part 78 at the circumferential center of the first half body 20 is smaller than the mated height dimension of the concave/convex mated part 78 in the second half body 22.

Particularly in this practical embodiment, in the bracket 18, both axial end portions of the mounting portion 56 are formed as the outside wall portions 64, 64 that are inclined inward in the radial direction as it goes to the axial outside. The outer peripheral end portion of the rubber elastic body 16 is arranged between the outside wall portions 64, 64 in the axial direction. As a result, the rubber elastic body 16 is positioned in the axial direction relative to the bracket 18 also by abutting engagement with the outside wall portions 64, 64 in the axial direction.

By so doing, resistance to be axially dislodged from the bracket 18 for the rubber elastic body 16 is secured sufficiently, and it is possible to prevent the rubber elastic body 16 from being displaced relative to the bracket 18 in the axial direction.

In addition, in a state where the stabilizer bushing for adhesive use 12 is mounted on the vehicle, when compression force in the up-down direction is input on the circumferentially center portion of the first half body 20 of the rubber elastic body 16, the compression force acting on the first half body 20 is less likely to generate a component force to the axial outside.

That is, the mated height dimension of the concave/convex mated part 78, which are constituted by fitting the first mountain portion 30 into the concave part 60, is small at the circumferentially center portion of the first half body 20 and the mounting portion 56. Especially in the present practical embodiment, the circumferentially center portion of the outer circumferential surface of the first half body 20 on which the main radial load is exerted is provided with the flat pressure-receiving portion 34. In other words, the height dimension of the first mountain portion 30 is substantially zero in the flat pressure-receiving portion 34, and the first mountain portion 30 substantially disappears. The mated height dimension of the concave/convex mated part 78 is substantially zero at the circumferentially center portion of the first half body 20. Therefore, with respect to the up-down compression force exerted on the circumferentially center portion of the first half body 20, extrusion of the first mountain portion 30 to the axial outside by the inside wall portion 66 of the concave part 60 of the bracket 18 being pressed against the first mountain portion 30 is less likely to occur in the circumferentially center portion of the first half body 20 that is greatly compressed. The rubber elastic body 16 is less likely to be deformed or displaced axially outward relative to the bracket 18. Therefore, the rubber elastic body 16 is scarcely dislodged from the bracket 18 in the axial direction. Additionally, noise generated by the axial displacement of the rubber elastic body 16 relative to the bracket 18 is prevented. In particular when water enters between the rubber elastic body 16 and the bracket 18, noise which might be induced by the rubber elastic body 16 being displaced axially relative to the bracket 18 hardly occurs.

In sum, in the both left and right side portions of the rubber elastic body 16 where the amount of elastic deformation becomes small with respect to the main radial load input in the up-down direction, there are provided the concave/convex mated parts 78 constituted by the first mountain portion 30, the left and right second mountain portions 46, 46 and the concave part 60. As a result, the rubber elastic body 16 and the bracket 18 are positioned in the axial direction. On the other hand, in the upper portion of the rubber elastic body 16 where the elastic deformation amount tends to become large with respect to the main radial load input in the up-down direction, there is provided the flat pressure-receiving portion 34 where the height of the first mountain portion 30 is substantially zero. By so doing, it is difficult for the first mountain portion 30 to be deformed or displaced in the axial direction relative to the bracket 18, thereby improving durability and preventing noise.

The height dimension of the first mountain portion 30 gradually decreases from the circumferentially opposite ends toward the flat pressure-receiving portion 34 in the circumferentially center portion. This prevents local concentration of stress in the elastic deformation of the rubber elastic body 16 including the first mountain portion 30, whereby the durability of the rubber elastic body 16 improves.

The first intermediate member 26 and the second intermediate member 42 are fixed to the radially middle portion of the rubber elastic body 16, thereby adjusting the spring characteristics in the radial direction, the axial direction, and the torsional direction of the rubber elastic body 16. In addition, the upper portion of the outer peripheral portion of the rubber elastic body 16 is compressed in the radial direction between the first intermediate member 26 and the bracket 18.

Consequently, when the rubber elastic body 16 is compressed in the up-down direction, the displacement amount of the outer circumferential surface of the rubber elastic body 16 superposed on the bracket 18 relative to the bracket 18 is reduced, so that prevention of noise and improvement in durability are more advantageously realized.

Although the practical embodiment of the present invention has been described in detail above, the present invention is not limited by the specific description of the practical embodiment. For example, the rubber elastic body is not necessarily limited to the structure wherein the first half body and the second half body are combined. Alternatively, it is possible that the rubber elastic body has a tubular shape that is integrally formed, and the rubber elastic body is divided by a slit in a part in the circumferential direction so that the stabilizer bar may be inserted into the insertion hole of the rubber elastic body through the slit.

In the above-described practical embodiment, there has been shown, as an example, the structure wherein the height dimension of the first mountain portion 30 is approximately zero at the circumferentially center portion of the first half body 20, which is the position of input of the main radial load. The rubber elastic body will do as long as the height dimension of the first mountain portion 30 is smaller at the position of input of the main radial load than at the other portion. That is, the height dimension of the first mountain portion 30 is not necessarily zero at the position of input of the main radial load. In summary, in the above-described practical embodiment, the first mountain portion 30 can be provided continuously so that the height dimension is larger than zero over the entire circumference of the first half body 20. In this case, the height dimension of the first mountain portion 30 in the circumferentially center portion is made smaller than the height dimension of the first mountain portion 30 on the circumferentially opposite side portions.

However, the mated height dimension of the concave/convex mated part in the present invention is a relative one. That is, it is also possible to provide a valley portion extending in the circumferential direction at both sides of the axially center portion of the rubber elastic body 16, thereby making the axially opposite sides the mountain portions, relative to the axially center portion. Alternatively, it is possible to provide the mountain portions that extend in the circumferential direction, by protruding both axial side portions of the rubber elastic body 16 further radially outward than the axially center portion.

In the above-said practical embodiment, there has been shown an example wherein the height dimension of the first mountain portion 30 gradually decreases from both circumferential ends toward the circumferentially center portion, and the mated height dimension of the concave/convex mated part 78 gradually decreases toward the circumferential center. However, for example, the mated height dimension of the concave/convex mated part 78 may be partially reduced, at the position of input of the main radial load. Alternatively, the mated height dimension of the concave/convex mated part 78 may be reduced toward the position of input of the main radial load, in a stepwise manner.

Further, it is preferable that the concave/convex mated part 78 is provided so as to extend in the circumferential direction of the rubber elastic body 16. However, as long as the rubber elastic body 16 and the bracket 18 are engaged with each other in the axial direction by fitting, the concave/convex mated part 78 does not necessarily have to extend in the circumferential direction. Furthermore, the concave/convex mated part 78 is not necessarily provided at each axial end as long as it is provided on each axial side of the rubber elastic body 16 and the bracket 18. For example, in the above-mentioned practical embodiment, it is possible as well that a protruding portion of the rubber elastic body 16 is provided on the axial outside of the first and second mountain portions 30, 46 that constitute the concave/convex mated part 78. Additionally, it is possible that a protruding part of the bracket 18 is provided at axial outside of the concave part 60 constituting the concave/convex mated part 78.

The position and direction of input of the main radial load shown in the aforementioned practical embodiment are merely examples. For example, the main radial load may be input at a position separated from the left-right central portion, in a radial direction inclined relative to the up-down direction.

In addition, an intermediate member such as the first intermediate member 26 and the second intermediate member 42 shown in the above-described practical embodiment is not indispensable. Further, the intermediate member does not have to be divided into the first intermediate member 26 and the second intermediate member 42 as the above-described practical embodiment. For example, it is possible to employ the intermediate member having a C-shaped cross section extending with a length that is shorter than one circumference in the circumferential direction of the rubber elastic body 16.

In the aforesaid practical embodiment, there has been described the structure wherein the rubber elastic body 16 attached to the stabilizer bar 14 in an externally attached state is disposed between the bracket 18 and the vehicle body 74 in the up-down direction. However, for example, it is possible to use a structure wherein the bracket comprises an upper bracket and a lower bracket, and the upper and lower brackets are mounted so as to respectively cover the upper and lower half circumferences of the outer peripheral surface of the rubber elastic body, and the rubber elastic body is pre-compressed between the upper and lower brackets, etc.

What is claimed is:

1. A stabilizer bushing for adhesive use comprising:
   a tubular rubber elastic body whose inner circumferential surface being configured to be adhered to a stabilizer bar;
   a bracket mounted onto an outer circumferential surface of the rubber elastic body and configured to be attached to a vehicle body; and
   concave/convex mated parts provided on axially opposite portions between the rubber elastic body and the bracket, the concave/convex mated parts protruding radially outward, wherein
   a mated height dimension of the concave/convex mated parts gradually decreases from circumferentially opposite sides toward a position of input of a main radial load in the rubber elastic body,
   the rubber elastic body is constituted by a first half body and a second half body each having a half tube shape, the first half body and the second half body being combined face-to-face with each other,
   a direction of input of the main radial load with respect to the rubber elastic body is a direction of combination of the first half body and the second half body,
   the first half body has a pair of mountain portions which constitute the radially concave/convex mated parts at each end portion in an axial direction, and a groove-shaped portion is formed axially between the pair of mountain portions of the first half body,
   a height dimension of the pair of mountain portions gradually decreases from circumferentially opposite ends toward a circumferentially center portion of the first half body, which is the position of input of the main radial load,
   the bracket has a pair of groove-shaped concave parts that are concave to a radial inside at each end portion in the axial direction, and by fitting the pair of mountain portions into the pair of concave parts, a concave/convex mate is provided, and
   a depth dimension of the groove-shaped portion gradually decreases from circumferentially opposite ends toward a circumferentially center portion, which is the position of input of the main radial load.

2. The stabilizer bushing according to claim 1, wherein the mated height dimension of the concave/convex mated part provided between the bracket and the circumferentially center portion of the first half body is smaller than the mated height dimension of the concave/convex mated part provided between the bracket and a pair of side faces of the second half body.

3. The stabilizer bushing according to claim 1, further comprising a rigid intermediate member disposed in a radially middle portion of the rubber elastic body and extending in the circumferential direction of the rubber elastic body.

4. The stabilizer bushing according to claim 1, wherein axially opposite end portions of the bracket superposed on the outer circumferential surface of the rubber elastic body include a tapered part inclining radially inward toward an axial outside.

5. A stabilizer bar equipped with a stabilizer bushing comprising the stabilizer bushing according to claim 1, wherein
   the inner circumferential surface of the rubber elastic body is pressed against an outer circumferential surface of the stabilizer bar, and the inner circumferential surface of the rubber elastic body is adhered to the outer circumferential surface of the stabilizer bar.

6. The stabilizer bushing according to claim 1, wherein the circumferentially center portion of the outer circumferential surface of the first half body on which the height dimension of the pair of mountain portions is substantially zero includes a flat pressure-receiving portion extending linearly in the axial direction over an entire axial length of the first half body, and
   the circumferentially center portion of the bracket includes a flat abutting portion on which the depth dimension of the pair of the concave parts is substantially zero.

* * * * *